US008613794B2

(12) United States Patent  (10) Patent No.: US 8,613,794 B2
Li et al.  (45) Date of Patent: Dec. 24, 2013

(54) PROCESS FOR PRODUCING A PRESSURISED $CO_2$ STREAM IN A POWER PLANT INTEGRATED WITH A $CO_2$ CAPTURE UNIT

(75) Inventors: Kuei-Jung Li, San Francisco, CA (US); Georgios Protopapas, Amsterdam (NL)

(73) Assignee: Shell Oil Company, Houston, TX (US)

( * ) Notice: Subject to any disclaimer, the term of this patent is extended or adjusted under 35 U.S.C. 154(b) by 602 days.

(21) Appl. No.: 12/524,175

(22) PCT Filed: Jan. 23, 2008

(86) PCT No.: PCT/EP2008/050734
§ 371 (c)(1),
(2), (4) Date: Feb. 24, 2010

(87) PCT Pub. No.: WO2008/090167
PCT Pub. Date: Jul. 31, 2008

(65) Prior Publication Data
US 2010/0139484 A1  Jun. 10, 2010

(30) Foreign Application Priority Data
Jan. 25, 2007 (EP) ..................................... 07101145

(51) Int. Cl.
*B01D 53/14* (2006.01)
(52) U.S. Cl.
USPC ................... 95/159; 95/162; 95/168; 95/191; 95/207; 95/227; 95/236; 423/228
(58) Field of Classification Search
USPC ............. 95/159, 191, 207, 227, 236; 60/273, 60/297, 310; 423/228, 229
See application file for complete search history.

(56) References Cited

U.S. PATENT DOCUMENTS 4,528,811 A * 7/1985 Stahl ............................... 60/784
5,623,822 A * 4/1997 Schuetzenduebel et al. .......................... 60/39.182

(Continued)

FOREIGN PATENT DOCUMENTS

EP  1486246  12/2004  ............ B01D 53/62
GB  899611  6/1962

(Continued)

*Primary Examiner* — Duane Smith
*Assistant Examiner* — Pankti Patel
(74) *Attorney, Agent, or Firm* — Charles W. Stewart

(57) ABSTRACT

A process for producing a pressurized $CO_2$ stream in a power plant integrated with a $CO_2$ capture unit, wherein the power plant comprises at least one gas turbine (1) coupled to a heat recovery steam generator unit (2) and the $CO_2$ capture unit comprises an absorber (18) and a regenerator (21), the process comprising the steps of: (a) introducing hot exhaust gas exiting a gas turbine into a heat recovery steam generator unit to produce a first amount of steam and a flue gas stream (17) comprising $CO_2$; (b) removing $CO_2$ from the flue gas stream comprising $CO_2$ by contacting the flue gas stream with absorbing liquid in an absorber (18) to obtain absorbing liquid enriched in $CO_2$ (20) and a purified flue gas stream; (c) contacting the absorbing liquid enriched in $CO_2$ with a stripping gas at elevated temperature in a regenerator (21) to obtain regenerated absorbing liquid and a gas stream enriched in $CO_2$ (23); (d) pressurizing the gas stream enriched in $CO_2$ using a $CO_2$ compressor (24) to obtain the pressurized $CO_2$ stream, wherein a first part of the steam produced in the heat recovery steam generator unit is used to drive the $CO_2$ compressor (13).

7 Claims, 1 Drawing Sheet

(56) References Cited

U.S. PATENT DOCUMENTS

| | | | |
|---|---|---|---|
| 5,832,712 A | 11/1998 | Ronning et al. | 60/39.02 |
| 6,036,888 A | 3/2000 | Minevski | 252/395 |
| 6,883,327 B2 * | 4/2005 | Iijima et al. | 60/649 |
| 2006/0032377 A1 | 2/2006 | Reddy et al. | 96/234 |
| 2007/0256559 A1 * | 11/2007 | Chen et al. | 95/169 |
| 2010/0320294 A1 * | 12/2010 | Neumann et al. | 239/556 |

FOREIGN PATENT DOCUMENTS

| | | | | |
|---|---|---|---|---|
| GB | 1234862 | * | 6/1971 | B01D 53/18 |
| GB | 2140873 | | 12/1984 | F02C 3/34 |
| WO | WO0048709 | | 8/2000 | B01D 53/14 |

* cited by examiner

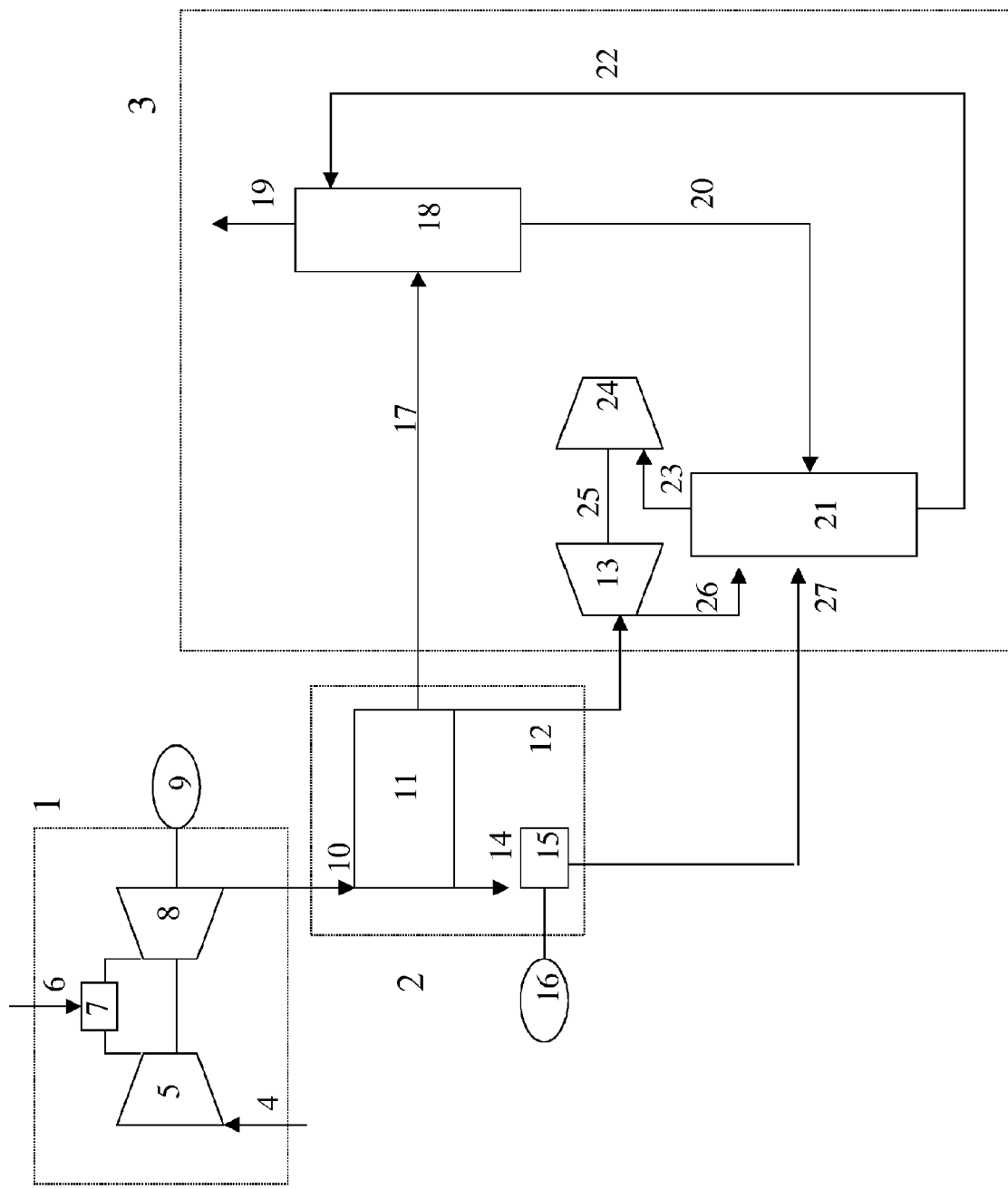

PROCESS FOR PRODUCING A PRESSURISED $CO_2$ STREAM IN A POWER PLANT INTEGRATED WITH A $CO_2$ CAPTURE UNIT

The present application claims priority from European Patent Application 07101145.6 filed 25 Jan. 2007.

The invention relates to a process for producing a pressurised $CO_2$ stream in a power plant integrated with a carbon dioxide ($CO_2$) capture unit.

A substantial portion of the world's energy supply is provided by combustion of fuels, especially natural gas or synthesis gas, in a power plant. Generally the fuel is combusted in one or more gas turbines and the resulting gas is used to produce steam. The steam is then used to generate power. Combustion of fuel results in the production of $CO_2$, which needs to be disposed of. During the last decades there has been a substantial global increase in the amount of $CO_2$ emission to the atmosphere. Following the Kyoto agreement, $CO_2$ emission has to be reduced in order to prevent or counteract unwanted changes in climate. Therefore, removal and disposal of the $CO_2$ produced is necessary. The $CO_2$ concentration of a gas turbine flue gas depends on the fuel and the combustion and heat recovery process applied and is generally relatively low, typically in the range of 3-15%. Thus, a reduction in the emission of $CO_2$ makes it desirable to separate the $CO_2$ from the exhaust gas because it will be too expensive to compress and deposit the whole flue gas. For this reason, it is advantageous to use a dedicated $CO_2$ capture unit, to remove $CO_2$ from the flue gas and generate a concentrated pressurised $CO_2$ stream, which can be used elsewhere.

A process to produce a pressurised $CO_2$ stream is described for example in U.S. Pat. No. 6,883,327. In U.S. Pat. No. 6,883,327, a $CO_2$ capture unit with an absorber and a regenerator is used. A stream enriched in $CO_2$ exiting the $CO_2$ regenerator is compressed in a compressor. This compressor is driven using a backpressure turbine as a power source.

It has now been found that a pressurised $CO_2$ stream can be produced using a steam-driven $CO_2$ compressor, thus eliminating the use of an additional device to generate power to drive a $CO_2$ compressor.

To this end, the invention provides a process for producing a pressurised $CO_2$ stream in a power plant integrated with a $CO_2$ capture unit, wherein the power plant comprises at least one gas turbine coupled to a heat recovery steam generator unit and the $CO_2$ capture unit comprises an absorber and a regenerator, the process comprising the steps of:
(a) introducing hot exhaust gas exiting a gas turbine into a heat recovery steam generator unit to produce a first amount of steam and a flue gas stream comprising $CO_2$;
(b) removing $CO_2$ from the flue gas stream comprising $CO_2$ by contacting the flue gas stream with absorbing liquid in an absorber to obtain absorbing liquid enriched in $CO_2$ and a purified flue gas stream;
(c) contacting the absorbing liquid enriched in $CO_2$ with a stripping gas at elevated temperature in a regenerator to obtain regenerated absorbing liquid and a gas stream enriched in $CO_2$;
(d) pressurising the gas stream enriched in $CO_2$ using a $CO_2$ compressor to obtain the pressurised $CO_2$ stream, wherein a first part of the steam produced in the heat recovery steam generator unit is used to drive the $CO_2$ compressor.

In the process, the $CO_2$ compressor is driven using high-pressure steam from the heat recovery steam generator unit. Thus, no separate device is needed to generate electricity to drive the $CO_2$ compressor.

In the process, a power plant comprising at least one gas turbine is used. Typically, fuel and an oxygen-containing gas are introduced into a combustion section of the gas turbine. In the combustion section of the gas turbine, the fuel is combusted to generate a hot combustion gas. The hot combustion gas is expanded in the gas turbine, usually via a sequence of expander blades arranged in rows, and used to generate power via a generator. Suitable fuels to be combusted in the gas turbine include natural gas and synthesis gas.

In step (a), hot exhaust gas exiting the gas turbine is introduced into to a heat recovery steam generator unit, where heat contained in the hot exhaust gas is used to produce a first amount of steam.

The heat recovery steam generator unit is any unit providing means for recovering heat from the hot exhaust gas and converting this heat to steam. For example, the heat recovery steam generator unit can comprise a plurality of tubes mounted stackwise. Water is pumped and circulated through the tubes and can be held under high pressure at high temperatures. The hot exhaust gas heats up the tubes and is used to produce steam.

Suitably, the heat recovery steam generator unit can be designed to produce one, two or three types of steam: high-pressure steam, intermediate pressure steam and low-pressure steam. Preferably, the steam generator is designed to produce at least a certain amount of high-pressure steam, because high-pressure steam can be used to generate power. Suitably, high-pressure steam has a pressure in the range of from 90 to 150 bara, preferably from 90 to 125 bara, more preferably from 100 to 115 bara. Suitably, low-pressure steam is also produced, the low-pressure steam preferably having a pressure in the range of from 2 to 10 bara, more preferably from to 8 bara, still more preferably from 4 to 6 bara. This low-pressure steam is used for the regeneration of the absorbing liquid comprising $CO_2$.

The heat recovery steam generator unit emits a flue gas comprising $CO_2$. The composition of the flue gas depends inter alia on the type of fuel used in the gas turbine. Suitably, the flue gas comprises in the range of from 0.25 to 30% (v/v) of $CO_2$, preferably from 1 to 20% (v/v). The flue gas usually also comprises oxygen, preferably in the range of from 0.25 to 20% (v/v), more preferably from 5 to 15% (v/v), still more preferably from 1 to 10% (v/v).

In step (b), $CO_2$ is removed by contacting the flue gas with an absorbing liquid in an absorber. The absorbing liquid may be any absorbing liquid capable of removing $CO_2$ from a flue gas stream. In particular, absorbing liquids capable of removing $CO_2$ from flue gas streams, which flue gas streams comprise oxygen and further have relatively low concentrations of $CO_2$, are suitable. Such absorbing liquids may include chemical and physical solvents or combinations of these.

Furthermore, in the event that the flue gas stream comprises an appreciable quantity of oxygen, suitably in the range of from 1 to 20% (v/v) of oxygen, preferably a corrosion inhibitor is added to the absorbing liquid. Suitable corrosion inhibitors are described for example in U.S. Pat. No. 6,036,888.

Suitable physical solvents include dimethylether compounds of polyethylene glycol.

Suitable chemical solvents include ammonia and amine compounds.

In one embodiment, the absorbing liquid comprises one or more amines selected from the group of monethanolamine (MEA), diethanolamine (DEA), diglycolamine (DGA), methyldiethanolamine (MDEA) and triethanolamine (TEA). MEA is an especially preferred amine, due to its ability to absorb a relatively high percentage of $CO_2$ (volume $CO_2$ per volume MEA). Thus, an absorbing liquid comprising MEA is suitable to remove $CO_2$ from flue gases having low concentrations of $CO_2$, typically 3-10 volume % $CO_2$.

In another embodiment, the absorbing liquid comprises one or more amines selected from the group of methyldiethanolamine (MDEA), triethanolamine (TEA), N,N'-di(hydroxyalkyl)piperazine, N,N,N',N'-tetrakis(hydroxyalkyl)-1,6-hexanediamine and tertiary alkylamine sulfonic acid compounds.

Preferably, the N,N'-di(hydroxyalkyl)piperazine is N,N'-d-(2-hydroxyethyl)piperazine and/or N,N'-di-(3-hydroxypropyl)piperazine.

Preferably, the tetrakis(hydroxyalkyl)-1,6-hexanediamine is N,N,N',N'-tetrakis(2-hydroxyethyl)-1,6-hexanediamine and/or N,N,N',N'-tetrakis(2-hydroxypropyl)-1,6-hexanediamine.

Preferably, the tertiary alkylamine sulfonic compounds are selected from the group of 4-(2-hydroxyethyl)-1-piperazineethanesulfonic acid, 4-(2-hydroxyethyl)-1-piperazinepropanesulfonic acid, 4-(2-hydroxyethyl)piperazine-1-(2-hydroxypropanesulfonic acid) and 1,4-piperazinedi (sulfonic acid).

In yet another embodiment, the absorbing liquid comprises N-ethyldiethanolamine (EDEA).

In an especially preferred embodiment, the absorbing liquid comprises ammonia.

It has been found that, especially when using an absorbing liquid comprising an amine, better absorption of CO2 is achieved when absorption takes place at relatively low temperature and at elevated pressure. As the pressure of the flue gas will typically be low, preferably the flue gas is pressurised prior to entering the absorber. As the temperature of the flue gas will typically be relatively high, preferably the flue gas is cooled prior to entering the absorber.

In step (c), the absorbing liquid enriched in $CO_2$ is regenerated by contacting the absorbing liquid enriched in $CO_2$ with a stripping gas at elevated temperature in a regenerator to obtain regenerated absorbing liquid and a gas stream enriched in $CO_2$. It will be understood that the conditions used for regeneration depend inter alia on the type of absorbing liquid and on the conditions used in the absorption step. In the event that the absorbing liquid comprises an amine, preferred regeneration temperatures are in the range of from 100 to 200° C. In the event that the absorbing liquid comprises an aqueous amine, regeneration preferably takes place at pressure in the range of from 1 to 5 bara.

In the event that the absorbing liquid comprises ammonia, suitably the absorbing step is performed at temperatures below ambient temperature, preferably in the range of from 0 to 10° C., more preferably from 2 to 8° C. The regeneration step is suitably performed at temperatures higher than used in the absorption step. When using an absorbing liquid comprising ammonia, the gas stream enriched in $CO_2$ exiting the regenerator has an elevated pressure. Suitably, the pressure of the gas stream enriched in $CO_2$ is in the range of from 5 to 8 bara, preferably from 6 to 8 bara. In applications where the gas stream enriched in $CO_2$ needs to be at a high pressure, for example when it will be used for injection into a subterranean formation, it is an advantage that the gas stream enriched in $CO_2$ is already at an elevated pressure. Normally, a series of compressors is needed to pressurise the gas stream enriched in $CO_2$ to the desired high pressures. A gas stream enriched in $CO_2$ which is already at elevated pressure is easier to further pressurise.

In step (d), the gas stream enriched in $CO_2$ is pressurised using a $CO_2$ compressor to obtain the pressurised $CO_2$ stream. A first part of the steam produced in the heat recovery steam generator unit is used to drive the $CO_2$ compressor. In a preferred embodiment, the first part of the steam produced in the heat recovery steam generator unit is led to an expander, which expander is coupled to the $CO_2$ compressor, for example via a shaft. The expander thus drives the $CO_2$ compressor, without the need to first produce electricity to drive the $CO_2$ compressor. In an especially preferred embodiment, the discharge of the expander comprises low-pressure steam, which low-pressure steam is used to provide at least part of the heat required by the regenerator. Thus, depending on the heat/power demand ration of the $CO_2$ capture unit, the pressure of the high pressure steam heat requirements of the regeneration step are at least partly met by combusting an amount of fuel in the heat recovery steam generator unit to produce a second amount of steam. Preferably, the pressurised $CO_2$ stream has a pressure in the range of from 40 to 300 bara, more preferably from 50 to 300 bara. A $CO_2$ stream having a pressure in these preferred ranges can be used for many purposes, in particular for enhanced recovery of oil, coal bed methane or for sequestration in a subterranean formation. Especially for purposes wherein the pressurised $CO_2$ stream is injected into a subterranean formation, high pressures are required. In a preferred embodiment, the pressurised $CO_2$ stream is used for enhanced oil recovery. By injecting $CO_2$ into an oil reservoir, the oil recovery rate can be increased. Typically, the pressurised $CO_2$ stream is injected into the oil reservoir, where it will be mixed with some of the oil which is present. The mixture of $CO_2$ and oil will displace oil which cannot be displaced by traditional injections.

In an especially preferred embodiment, the process further comprises an additional step (e) of combusting an amount of fuel in the heat recovery steam generator unit to produce a second amount of steam, wherein the amount of fuel is such that the second amount of steam is sufficient to provide at least 80% of the heat needed for the regeneration of the absorbing liquid. Preferably the second amount of steam is sufficient to provide at least 90% of the heat needed for the regeneration of the absorbing liquid. Preferably, low pressure steam piping is used to deliver the heating steam from the heat recovery steam generator to the $CO_2$ capture unit. This low pressure steam piping is suitably arranged in a closed loop to segregate the steam produced which is used for power production from steam used in process heat exchangers. Combusting an amount of fuel in the heat recovery steam generator unit has the advantage that the total power output of the power plant will be independent of whether or not the $CO_2$ capture unit is in operation. The amount of fuel needed to provide for the regeneration heat requirements can for example be determined by monitoring the power generated by the heat recovery steam generator unit and adjusting the amount of fuel introduced into the heat recovery steam generator unit in dependence of the amount of power generated. As explained earlier, in the heat recovery steam generator unit preferably high pressure steam is produced in a steam turbine, which high pressure steam is converted to power, for example via a generator coupled to the steam turbine. The power output of the generator coupled to the steam turbine will decrease when the $CO_2$ capture unit is in operation, due to the amount of steam extracted from the heat recovery steam generator unit needed to heat up the regenerator of the $CO_2$ capture unit. By monitoring the output of generator coupled to the steam turbine of the heat recovery generator unit, the amount of fuel combusted in the heat recovery steam generator unit can be adjusted. In the event that the output decreases, the amount of fuel combusted can be increased. Preferably, the amount of fuel to be combusted in order to enable fulfilling the heat requirements of the regenerator of the $CO_2$ capture unit without significantly diminishing the power output of the generator coupled to the steam turbine is predetermined. The power output of the generator coupled to the steam turbine when the $CO_2$ capture unit is not in operation is taken as a base case and the amount of fuel to be combusted in order to achieve the same output is then determined.

Suitable fuels for combustion in the heat recovery steam generator unit include natural gas and synthesis gas.

Combustion of the amount of fuel in the heat recovery steam generator unit requires the presence of oxygen. This oxygen can be supplied to the heat recovery steam generator unit, but preferably the hot exhaust gas comprises oxygen and at least part of this oxygen is used in the combustion of the fuel in the heat recovery steam generator unit. As a result of using oxygen from the hot exhaust gas, the amount of oxygen in the flue gas exiting the heat recovery steam generator unit will be lower. This is favourable for the $CO_2$ absorption process, especially when an amine absorbing liquid is used. Oxygen can cause amine degradation and can lead to the formation of degradation products in the absorbing liquid. A lower oxygen content of the flue gas will therefore result in less amine degradation.

The invention will now be illustrated, by means of example only, with reference to the accompanying FIG. 1.

In FIG. 1, a power plant comprising a gas turbine (1), a heat recovery steam generator unit (2) and a $CO_2$ capture unit (3) is shown. In the gas turbine, an oxygen-containing gas is supplied via line 4 to compressor 5. Fuel is supplied via line 6 to combustor 7 and combusted in the presence of the compressed oxygen-containing gas. The resulting combustion gas is expanded in a first expander 8 and used to generate power in generator 9. Remaining exhaust gas comprising $CO_2$ and oxygen is led via line 10 to a heat recovery steam generator unit 2. In the heat recovery steam generator unit, water is heated against the hot exhaust gas in heating section 11 to generate steam. A first part of the steam is led via line 12 to a second expander 13. A second part of the steam is led via line 14 to a steam turbine 15 coupled to generator 16 to produce additional power. Optionally, an amount of fuel is led (not shown) to the heat recovery steam generator unit and combusted, using oxygen from the exhaust gas, to produce additional steam. Hot flue gas comprising $CO_2$ and oxygen is led via line 17 to an amine absorber 18. Preferably, the hot flue gas is first cooled in a cooler (not shown) and the cooled flue gas is pressurised using a blower (not shown) prior to entering the amine absorber. In amine absorber 18, $CO_2$ is transferred at elevated pressure from the flue gas to the amine liquid contained in the amine absorber. Purified flue gas, depleted in $CO_2$, is led from the amine absorber via line 19. Amine liquid, enriched in $CO_2$ is led from the amine absorber via line 20 to a regenerator 21. In the regenerator, amine liquid enriched in $CO_2$ is depressurised and contacted with a stripping gas at elevated temperature, thereby transferring $CO_2$ from the amine liquid to the stripping gas to obtain regenerated amine liquid and a gas stream enriched in $CO_2$. Regenerated amine liquid is led from the regenerator via line 22 to the amine absorber 18. The gas stream enriched in $CO_2$ is led from the regenerator via line 23 to a $CO_2$ compressor 24. High-pressure steam from expander 13 is led via a shaft 25 to the $CO_2$ compressor 24 and is used to drive the $CO_2$ compressor. Low-pressure steam is led from expander 13 via line 26 to the regenerator and provides at least part of the heat needed to heat up the regenerator. The remaining part of the heat requirements of the regenerator are fulfilled using low pressure from the second steam turbine, which low pressure is led to the regenerator via line 27.

What is claimed is:

1. A process for producing a pressurised $CO_2$ stream in a power plant integrated with a $CO_2$ capture unit, the process comprising the steps of:
    (a) introducing hot exhaust gas exiting a gas turbine into a heat recovery steam generator unit to produce high-pressure steam and a flue gas stream comprising $CO_2$;
    (b) removing $CO_2$ from the flue gas stream comprising $CO_2$ by contacting the flue gas stream with an absorbing liquid in an absorber to obtain an absorbing liquid enriched in $CO_2$ and a purified flue gas stream;
    (c) contacting the absorbing liquid enriched in $CO_2$ with a stripping gas at elevated temperature in a regenerator to obtain regenerated absorbing liquid and a gas stream enriched in $CO_2$;
    (d) pressurising the gas stream enriched in $CO_2$ using a $CO_2$ compressor to obtain the pressurised $CO_2$ stream, wherein a first part of the high-pressure steam produced in the heat recovery steam generator unit is used to drive the $CO_2$ compressor by passing the first part of the high-pressure steam to an expander, which expander is coupled to the $CO_2$ compressor and discharges low-pressure steam, which low-pressure steam is used to provide at least part of the heat needed for the regeneration of the absorbing liquid; and
    (e) generating power by leading a second part of the high-pressure steam produced in the heat recovery steam generator unit to a steam turbine, which steam turbine is coupled to a generator and power is produced by the generator.

2. A process according to claim 1, wherein the amount of low-pressure steam discharged is sufficient to provide at least 80% of the heat needed for the regeneration of the absorbing liquid.

3. A process according to claim 2, wherein the high-pressure steam has a pressure in the range of from 90 to 125 bara and the low-pressure steam has a pressure in the range of from 3 to 8 bara.

4. A process according to claim 3, wherein the pressurised gas stream enriched in $CO_2$ has a pressure in the range of from 40 to 300 bara.

5. A process according to claim 4, wherein the absorbing liquid comprises an amine selected from the group consisting of monethanolamine (MEA), diethanolamine (DEA), diglycolamine (DGA), methyldiethanolamine (MDEA), triethanolamine (TEA), N-ethyldiethanolamine (EDEA), N,N'-di (hydroxyalkyl)piperazine, N,N,N',N'-tetrakis (hydroxyalkyl)-1,6-hexanediamine and tertiary alkylamine sulfonic acid compounds.

6. A process according to claim 5, wherein the absorbing liquid comprises a physical solvent.

7. A process according to claim 6, wherein the absorbing liquid comprises ammonia.

* * * * *